US008970723B2

(12) United States Patent
Ushijima

(10) Patent No.: US 8,970,723 B2
(45) Date of Patent: Mar. 3, 2015

(54) DEVICE AND METHOD FOR IMAGE PROCESSING CAPABLE OF TRACKING TARGET OBJECT

(71) Applicant: Fujitsu Limited, Kawasaki (JP)

(72) Inventor: Satoru Ushijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 12 days.

(21) Appl. No.: 13/666,369

(22) Filed: Nov. 1, 2012

(65) Prior Publication Data
US 2013/0057728 A1 Mar. 7, 2013

Related U.S. Application Data

(63) Continuation of application No. PCT/JP2010/057904, filed on May 10, 2010.

(51) Int. Cl.
H04N 5/228 (2006.01)
G03B 15/00 (2006.01)
G03B 13/36 (2006.01)
H04N 5/232 (2006.01)

(52) U.S. Cl.
CPC .............. *G03B 15/00* (2013.01); *G03B 13/36* (2013.01); *H04N 5/23212* (2013.01); *H04N 5/23219* (2013.01)
USPC ...................................................... 348/222.1

(58) Field of Classification Search
CPC ................................................. H04N 21/4728
USPC ....................................................... 348/231
See application file for complete search history.

(56) References Cited

U.S. PATENT DOCUMENTS

| 2007/0263904 A1 | 11/2007 | Muramatsu |
| 2009/0028386 A1 | 1/2009 | Michimoto et al. |
| 2012/0087544 A1 | 4/2012 | Muramatsu |

FOREIGN PATENT DOCUMENTS

| JP | 59-79868 | 5/1984 |
| JP | 2003-319386 | 11/2003 |
| JP | 2004-334335 | 11/2004 |
| JP | 2005-348003 | 12/2005 |
| JP | 2007-208453 | 8/2007 |
| JP | 2007-282188 | 10/2007 |
| JP | 2008-3335 | 1/2008 |
| JP | 2008-191760 | 8/2008 |
| JP | 2008191760 A * | 8/2008 |

(Continued)

OTHER PUBLICATIONS

International Search Report of PCT/JP2010/057904 mailed Aug. 10, 2010.
PCT International Preliminary Report on Patentability mailed Dec. 20, 2012 in corresponding International Application No. PCT/JP2010/057904.

(Continued)

*Primary Examiner* — Gary C Vieaux
(74) *Attorney, Agent, or Firm* — Staas & Halsey LLP

(57) ABSTRACT

An image processing device includes: an extractor configured to extract a region of interest which satisfies a specified condition from a first image frame; a size decision unit configured to decide an image size according to a size of the region of interest extracted by the extractor; and an image converter configured to change the size of an image frame to be processed according to the image size decided by the size decision unit to generate a transformed image frame. The extractor extracts a region of interest which satisfies the specified condition from the transformed image frame.

6 Claims, 11 Drawing Sheets

(56) References Cited

FOREIGN PATENT DOCUMENTS

| | | |
|---|---|---|
| JP | 2009-225236 | 10/2009 |
| WO | WO 2008/114683 | 9/2008 |

OTHER PUBLICATIONS

Japanese Office Action mailed Oct. 29, 2013 in corresponding Japanese Patent Application No. 2012-514623.

\* cited by examiner

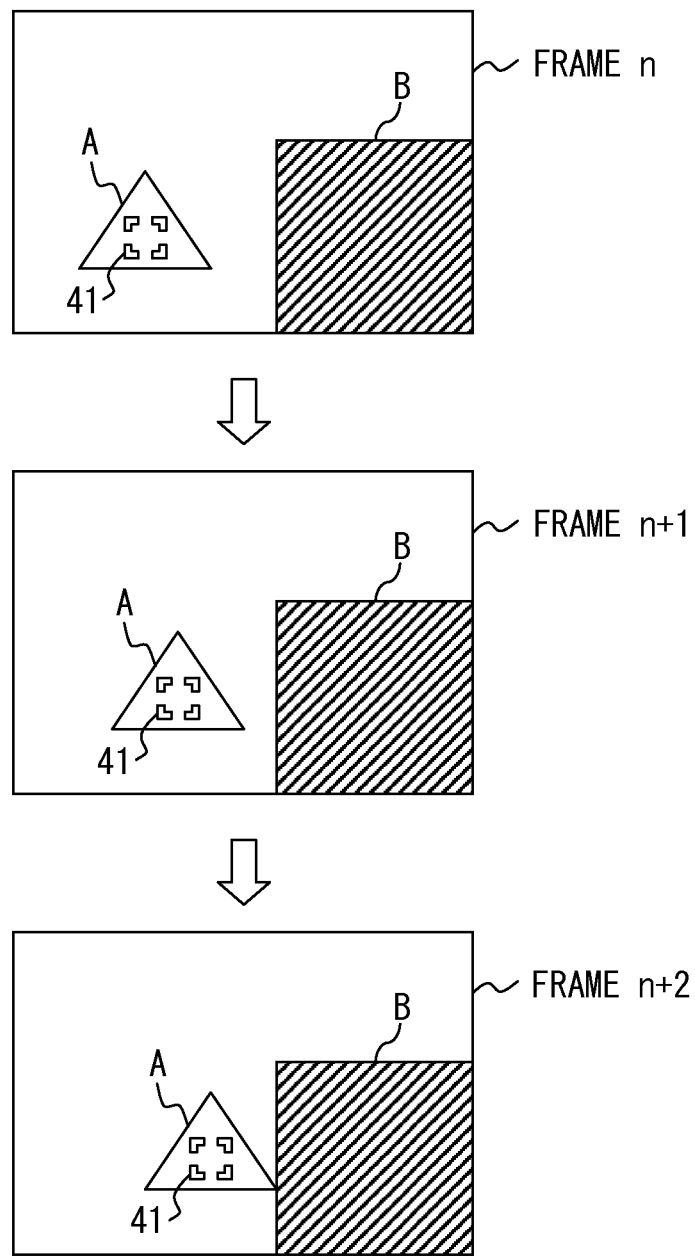
F I G. 2

IMAGE CONVERSION TABLE

|  | WIDTH OF TRANSFORMED IMAGE | HEIGHT OF TRANSFORMED IMAGE | THRESHOLD 1: FOR DECREASING REDUCTION LEVEL | THRESHOLD 2: FOR INCREASING REDUCTION LEVEL |
|---|---|---|---|---|
| REDUCTION LEVEL 1 (100%) | 40 | 32 | −1 | 100 |
| REDUCTION LEVEL 2 (50%) | 20 | 16 | 25 | 100 |
| REDUCTION LEVEL 3 (25%) | 10 | 8 | 25 | ∞ |

F I G. 5

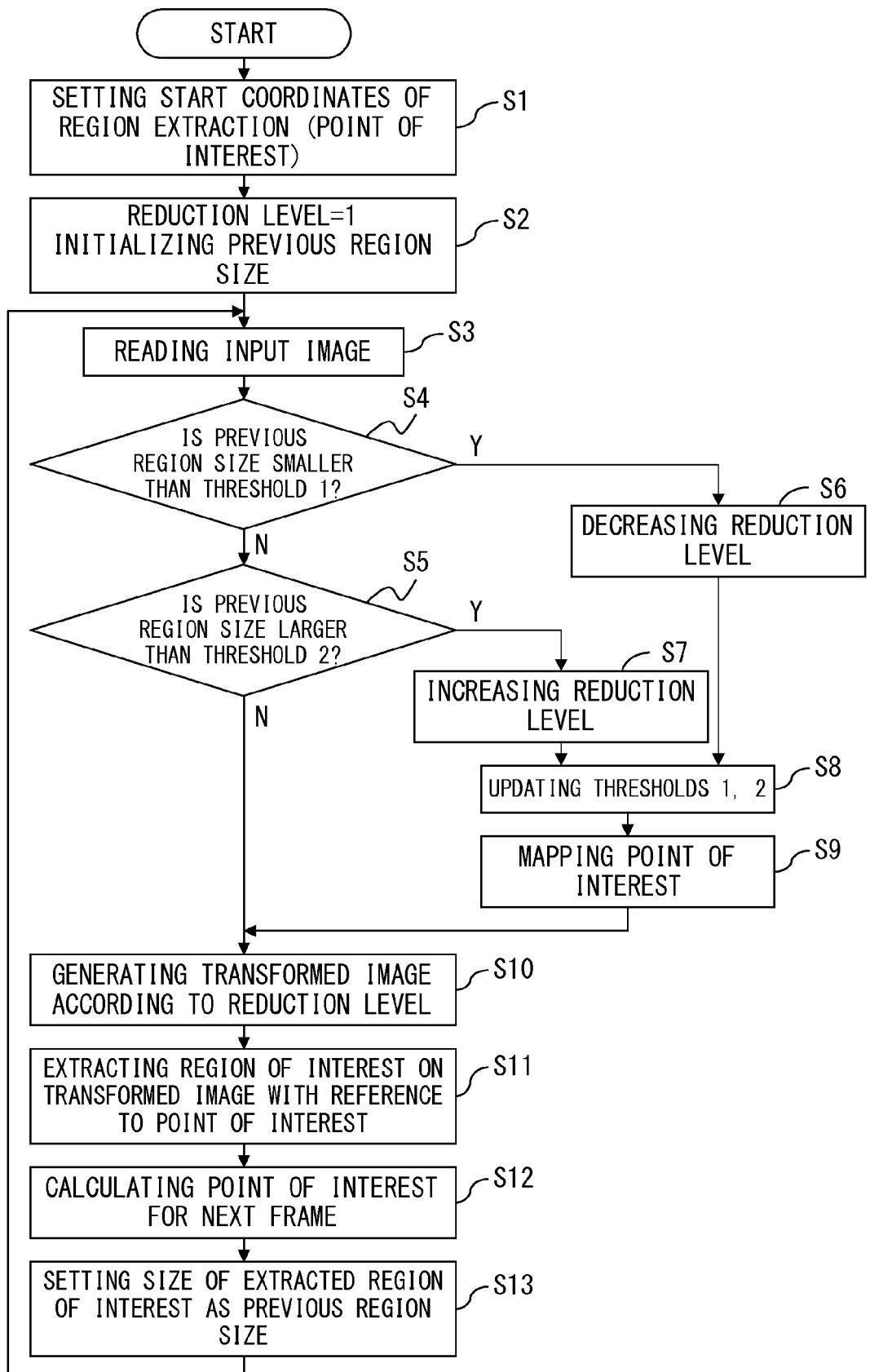
F I G. 7

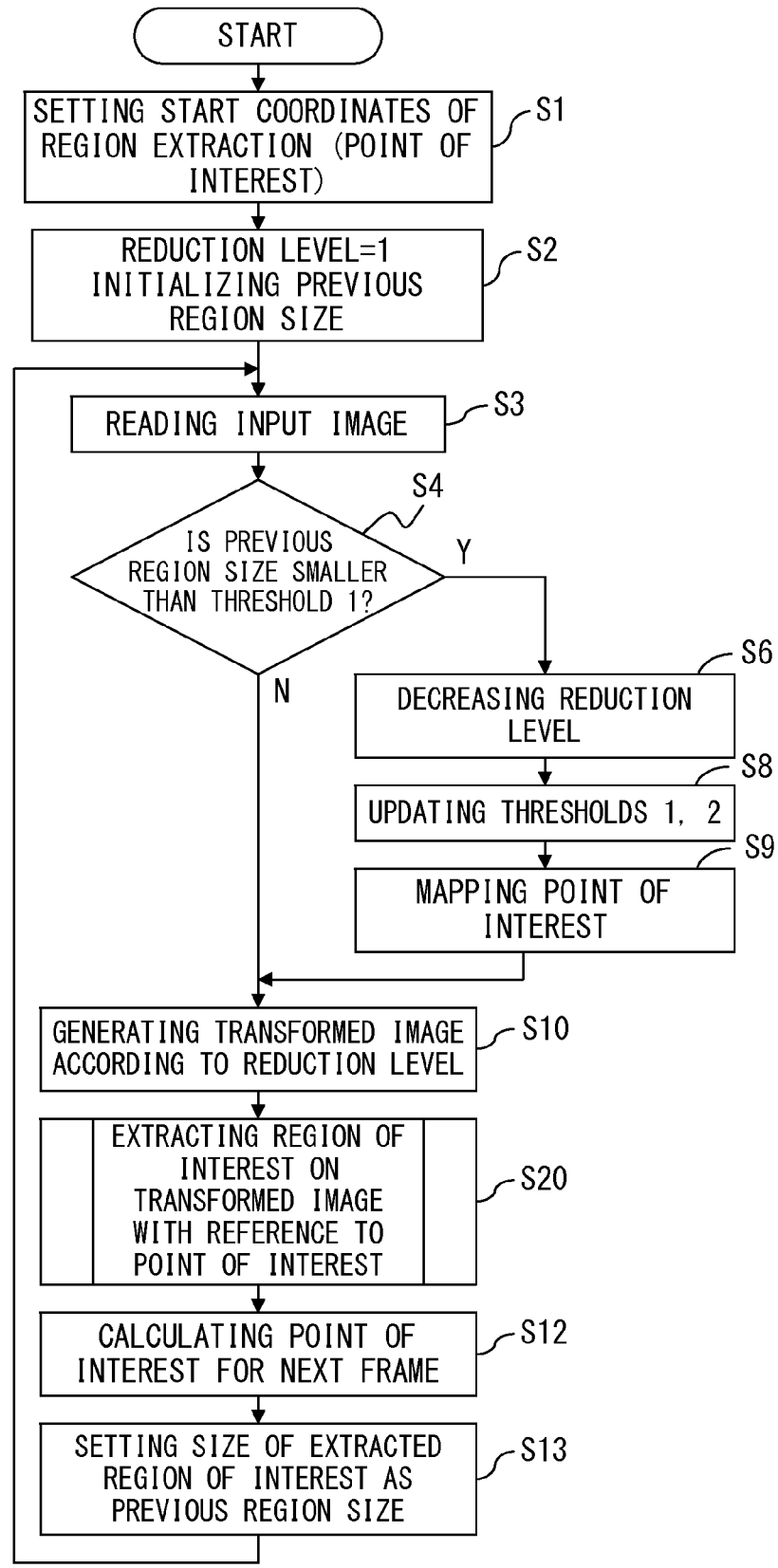
F I G. 9 A

DEVICE AND METHOD FOR IMAGE PROCESSING CAPABLE OF TRACKING TARGET OBJECT

CROSS-REFERENCE TO RELATED APPLICATION

This application is a continuation application of International Application PCT/JP2010/057904 filed on May 10, 2010 and designated the U.S., the entire contents of which are incorporated herein by reference.

FIELD

The embodiments described herein are related to an image processing device and an image processing method for processing image data from a digital camera.

BACKGROUND

Digital cameras (or electronic cameras) with the function of tracking moving subjects are known. Even if a subject desired by a user moves, such digital cameras can track the subject and maintaining the focus.

As an example of the related art, an automatic tracking device is known that is capable of tracking an object in a stable manner while zooming in to and out from the object at high speed, where failure in the automatic tracking due to the zooming process is resolved. Such an automatic tracking device includes a first object detector, a first zoom controller, a second object detector, a template matching unit, and a second zoom controller. The first object detector detects an object from an image captured by the camera. The first zoom controller changes the zoom magnification of the camera when the size of the detected object is smaller than a specified size on an image. The second object detector detects an object again from an image captured by the camera after the zoom magnification is changed. The template matching unit compares the object detected by the second object detector with the image captured by the camera to locate the position of the object, thereby tracking the object on the image. The second zoom controller controls the zoom magnification of the camera such that the object being tracked will be in a specified size on the image captured by the camera. (For example, see Japanese Laid-open Patent Publication No. 2007-208453.)

As another example of the related art, a moving object tracking device which includes a camera, a first memory, a second memory, and a correlator is known. The camera includes a zooming mechanism. The first memory stores image signals which are sequentially input from the camera. The second memory extracts the image of a specified tracking object from the first memory, and stores the extracted image. The correlator extracts from the images in the first memory an image which is most similar to the image in the second memory. The moving object tracking device stores the image extracted by the correlator in the second memory as a new image of the tracking object, and controls the angle and zooming mechanism of the camera according to a difference between the currently stored image and the previously stored image. (For example, see Japanese Laid-open Patent Publication No. 59-079868.)

As another example of the related art, an image transmission system is known which enables a mobile station device to display moving images or continuous images which are partly selected from the captured video images taken by a video camera. This image transmission system includes: a video camera provided with a control drive device; a camera controller which detects the face of a subject animal from the data of the captured image to generate a control signal which controls the video camera to track the face of the subject animal; an image-data editor which modifies and edits the data of the captured image; and a transmission system which transmits continuous images, which are partly selected from the data of the captured image by the image-data editor, or moving image data to a mobile station device. The image-data editor converts the image obtained by extracting a face portion of the subject animal from the data of the captured image into an image with an approximately constant number of pixels and constant size, and then transmits the converted image. (For example, see Japanese Laid-open Patent Publication No. 2003-319386.)

In the object tracking where a subject is tracked by using images in a digital camera, a color region that matches the subject in an image frame is extracted for example. Here, in order to extract a target subject from the image frame according to the color components, a procedure is used in which whether or not the pixel values of neighboring pixels are the same as those of a target pixel is repeatedly determined.

On the other hand, real-time tracking is used for a digital camera that performs auto-focus control by using a result of object tracking. In other words, it is preferred that the processing time taken for extracting a region that corresponds to a target subject from the image frames be shortened.

However, when a target subject is large on an image frame, the amount of processing needed for extracting regions that correspond to the target subject becomes large. In other words, the processing time needed for object tracking becomes longer depending on the state of the target subject in an image frame.

SUMMARY

According to an aspect of the embodiments, an image processing device includes: an extractor configured to extract a region of interest which satisfies a specified condition from a first image frame; a size decision unit configured to decide an image size according to a size of the region of interest extracted by the extractor; and an image converter configured to change the size of an image frame to be processed according to the image size decided by the size decision unit to generate a transformed image frame. The extractor extracts a region of interest which satisfies the specified condition from the transformed image frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates the object tracking by a digital camera.

FIG. 5 illustrates an example of an image conversion table.

FIG. 7 is a flowchart illustrating the processes of an object tracking unit.

FIGS. 9A and 9B are flowcharts illustrating the processes of an object tracking unit according to the embodiment of FIG. 8.

DESCRIPTION OF EMBODIMENTS

Figure 1:
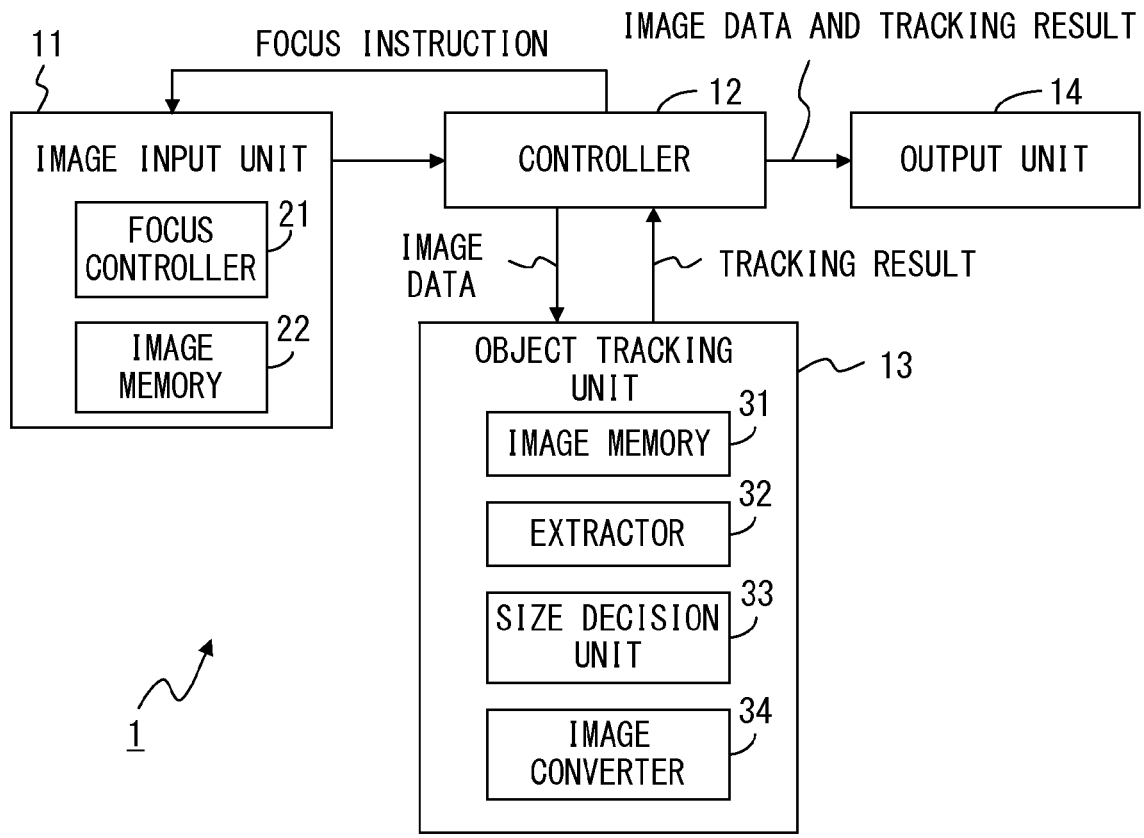
FIG. 1 illustrates the configuration of a digital camera including an image processing device according to an embodiment.

FIG. 1 illustrates the configuration of a digital camera 1 including an image processing device according to an embodiment. The digital camera (electronic camera) 1 includes an image input unit 11, a controller 12, an object tracking unit 13, and an output unit 14.

The image input unit 11 includes, for example, an image sensor such as a CCD sensor or a CMOS sensor, and generates image data by taking a picture. Here, the image input unit 11 can sequentially generate image data at specified time intervals. In other words, the image input unit 11 can sequentially generate and output image data at different timings. The time interval is not particularly limited, but is, for example, about 30 frames/second. The image input unit 11 includes a focus controller 21 which adjusts the focal length according to a focus instruction from the controller 12. Moreover, the image input unit 11 includes an image memory 22 which stores image data obtained by the image sensor.

The controller 12 controls the operations of the digital camera 1. The controller 12 starts the object tracking unit 13, and transfers the image data obtained by the image input unit 11 to the object tracking unit 13 to request an object tracking process. Then, the controller 12 sends a focus instruction to the image input unit 11 according to a tracking result given by the object tracking unit 13. In addition, the controller 12 transmits the image data obtained by the image input unit 11 and the tracking result given by the object tracking unit 13 to the output unit 14.

The controller 12 may also perform other control operations. For example, the controller 12 provides a user interface, and controls the operation of the digital camera 1 according to an instruction given by a user. Further, the controller 12 may control the operations of the digital camera 1 by using various kinds of sensors provided for the digital camera 1.

The output unit 14 includes, for example, a liquid crystal display, and displays the image data obtained by the image input unit 11. At this time, the output unit 14 can superimposes the tracking result given by the object tracking unit 13 on the image data obtained by the image input unit 11. Note that the combining process of image data indicating the tracking result and the image data obtained by the image input unit 11 may be performed by either of the controller 12 and the output unit 14. The output unit 14 may provide the function of receiving an instruction from a user with a touch panel device. Although the image data displayed on the output unit 14 is the image data obtained by the image input unit 11, it is not always necessary for the image data to be stored as the image data that is actually obtained by photo shooting. In other words, the output unit 14 may display the image data obtained by the image input unit 11 as a viewfinder image.

The object tracking unit 13 performs an object tracking process by using the image data obtained by the image input unit 11. In other words, the object tracking unit 13 is implemented by an image processing device. This image processing device is realized, for example, by one or a plurality of semiconductor IC chips including a processor that executes an image processing program describing object tracking procedures. Alternatively, the image processing device may be realized by a hardware circuit that performs the object tracking procedure. Further, the image processing device may include hardware and software.

FIG. 2 illustrates the object tracking by the digital camera 1. Here, pictures are taken by the image input unit 11 at times T, T+1, and T+2, and image frames n, n+1, and n+2 are generated. In this case, the output unit 14 sequentially displays the image frames n, n+1, and n+2. On each of the image frames, image regions that cover a subject "A" and an object "B" are formed. In this example, a subject A is a moving object, and an object B is a non-moving object.

It is assumed that a user designates a target subject (a subject that a user wants to focus on) while viewing, for example, an image being displayed on the output unit 14. Here, it is assumed that a user designates the subject A as the target subject. An instruction from a user to designate the subject A is received by the controller 12. In response to the instruction from a user, the controller 12 provides a focus instruction to the image input unit 11. Accordingly, the focus controller 21 controls a focal point adjustment mechanism (for example, an optical system including one or a plurality of lenses) in order for the subject A to be in focus. Then, the image input unit 11 takes the next picture in the state where the focal length is controlled. Note that the image data obtained by taking a picture in the state where the focal length is controlled is stored in the image memory 22. Moreover, the controller 12 instructs the output unit 14 to display a focus mark. Accordingly, a focus mark 41 is superimposed on the subject A in an image displayed on the output unit 14.

The object tracking unit 13 tracks the subject A designated by a user by using the image data obtained by the image input unit 11. At that time, the object tracking unit 13 detects an image region that covers the subject A in each of the image frames n, n+1, and n+2. Then, a tracking result given by the object tracking unit 13 is sent to the controller 12.

As described above, the controller 12 sends a focus instruction to the image input unit 11 according to a tracking result given by the object tracking unit 13, and notifies the output unit 14 of the tracking result. Accordingly, the image input unit 11 can continue taking pictures with the focus on the subject A being maintained even if the subject A is moving. In an image displayed on the output unit 14, the position at which the focus mark 41 is displayed is controlled according to the movement of the subject A. In other words, as illustrated in FIG. 2, the state in which the focus mark 41 is superimposed on an image region that covers the subject A is maintained.

Figure 3:
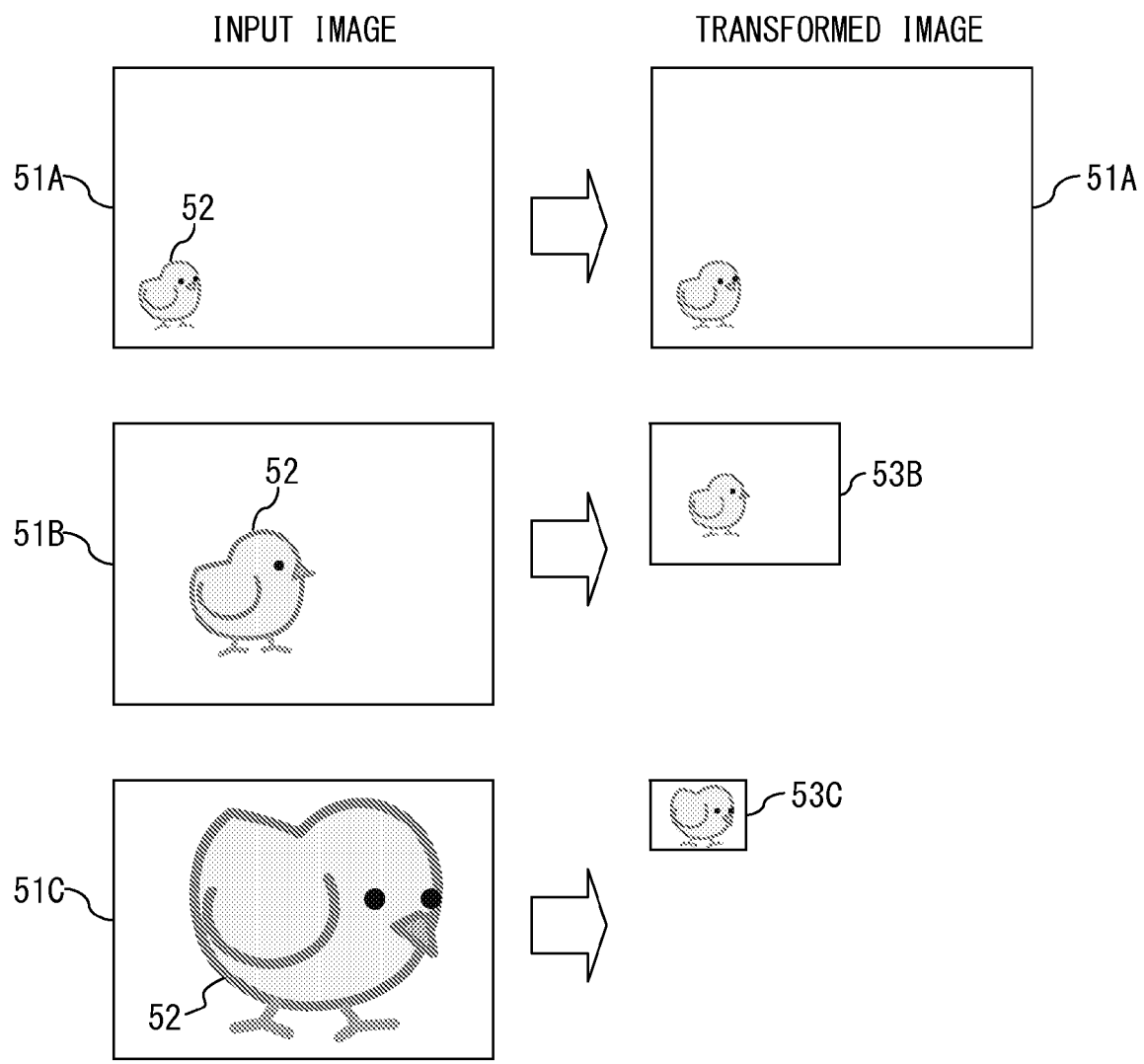
FIG. 3 illustrates an outline of the operations of an object tracking unit.

Next, the outline of the operations by the object tracking unit 13 will be explained with reference to FIG. 3. In FIG. 3, image frames 51A, 51B, and 51C are generated by the image input unit 11 and are input to the object tracking unit 13, respectively. A subject 52 is captured on the image frames 51A, 51B, and 51C. The subject 52 is the tracking target object designated by a user.

The object tracking unit 13 includes an image memory 31, an extractor 32, a size decision unit 33, and an image converter 34 so as to provide an image processing method that realizes the object tracking. The image memory 31 stores an image frame. Moreover, the object tracking unit 13 includes a memory (not illustrated) that is used by the extractor 32, the size decision unit 33, and the image converter 34 as a working area for image processing.

The image frames output from the image input unit 11 are sequentially transferred by the controller 12 to the object tracking unit 13. The object tracking unit 13 stores the input image frames in the image memory 31.

The extractor 32 extracts from the input image frames a region of interest which satisfies a specified condition. At this time, the extractor 32 extracts from the input image frames a region of interest which includes a point of interest and satisfies a specified condition. The point of interest is a pixel (or coordinates) that is designated in the immediately previous image frame, which will be explained later in detail. Note that the initial value of a point of interest is designated, for example, by a user. A user can designate a target subject while viewing an image which is being displayed on the output unit 14. In this case, the center (or barycenter) of an image region that corresponds to the subject designated by a user is used as the initial value of the point of interest.

In this example, the "specified condition" is expressed by a pixel value. The pixel value represents the amount of a certain characteristic of a pixel. As the pixel value, a luminance component and/or a color-difference component may be used, for example. The extractor 32 extracts a pixel that has a pixel value that is the same as or similar to the pixel value at a point of interest. By way of an example, it is assumed that when the luminance component of a pixel is expressed by 0 to 255, the luminance component of the pixel at a point of interest is "210". In this case, the extractor 32 extracts, for example, a pixel whose luminance component value is between 200 and 220 in the input image frame. By way of another example, it is assumed that when the color component of a pixel is expressed between 0 and 255 for each of RGB, the R-component, G-component, and B-component of the pixel at a point of interest are "100", "140", and "85", respectively. In this case, the extractor 32 extracts, for example, a pixel that satisfies three conditions, that the values of the R-component, G-component, and B-component are respectively within the range of 90 to 110, the range of 130 to 150, and the range of 75 to 95, in the input image frame. By way of still another example, when the color component of a pixel is expressed by the three components of luminance, saturation, and hue, the ranges of the components are determined in a similar manner to the above and a pixel that satisfies the conditions of the determined ranges may be extracted.

At that time, the extractor 32 extracts continuous image regions that include a point of interest. For example, the extractor 32 extracts a region of interest by the following procedures.
(1) The pixel value the pixel at a point of interest is detected.
(2) When the difference between the pixel value of a neighboring pixel (upper, lower, right, left) of a point of interest and the pixel value of the pixel at the point of interest is smaller than a specified threshold, the neighboring pixel is extracted as a pixel that belongs to a region of interest.
(3) An extraction process which is similar to procedure (2) above is performed on neighboring pixels of the pixel extracted in procedure (2) above.
(4) Until a neighboring pixel, the difference between the pixel value of the neighboring pixel and the pixel value of the pixel at a point of interest being smaller than a specified threshold, is no longer detected, the processes in procedures (2) to (3) are executed.

In procedures (1) to (4), a region of continuous pixels having the pixel value similar to that of a pixel at a point of interest (i.e., a region of interest) in the input image frame is extracted. Here, the extraction of a region of interest may be realized by a known method, which does not indicate any limitation in particular.

The extractor 32 may extract a region of interest from a transformed image frame that is obtained by converting the image size of the input image frame as necessary, instead of extracting a region of interest from the input image frame. For example, the extractor 32 extracts a region of interest from a transformed image frame that is obtained by reducing the size of the input image frame.

The object tracking unit 13 extracts a region of interest from each image frame, and outputs the information that indicates the position of a region of interest (i.e., coordinates in the image frame) as a tracking result. When the area of a region of interest is large in an image frame, the number of pixels that form the region of interest becomes large. Thus, the execution time taken for the aforementioned procedures (1) to (4) becomes longer. For this reason, the object tracking unit 13 reduces the size of an image frame in accordance with the size of a region of interest on the image frame. Then, the region of interest is extracted from the downsized image frame.

By way of an example, it is assumed that the image frame 51A of FIG. 3 is input to the object tracking unit 13. In the image frame 51A, the image region that covers the subject 52 as a tracking target object is small. In this case, the object tracking unit 13 decides that it is not necessary to reduce the size of the input image frame 51A. In other words, the object tracking unit 13 extracts the subject 52 from the input image frame 51A without changing the size of the input image frame 51A.

In the image frame 51B, the image region that covers the subject 52 is relatively large in comparison to the image frame 51A. In this case, the object tracking unit 13 decides to reduce the size of the input image frame 51B. In the example of FIG. 3, the reduction rate for the input image frame 51B is fifty percent. Here, the reduction rate of fifty percent indicates the reduction of the area to one fourth of its original size. Then, the object tracking unit 13 extracts the subject 52 from the transformed image frame 53B that is obtained by reducing the size of the input image frame 51B at the above reduction rate.

In the image frame 51C, the image region that covers the subject 52 is even larger than the image frame 51B. In this case, the object tracking unit 13 decides to further reduce the size of the input image frame 51C. In the example of FIG. 3, the reduction rate is twenty-five percent. Here, the reduction rate of twenty-five percent indicates the reduction of the area to one sixteenth of its original size. Then, the object tracking unit 13 extracts the subject 52 from the transformed image frame 53C that is obtained by reducing the size of the input image frame 51C at the above reduction rate.

Here, the reduction rate is determined, for example, such that the areas of the image regions that cover the tracking target object will be approximately the same between the image frames. In the example of FIG. 3, the reduction rate is determined such that the image region of the subject 52 will be approximately the same between the input image frame 51A and the transformed image frames 53B and 53C.

Incidentally, as described above, the digital camera 1 according to the embodiment captures an image repeatedly with a short time interval. The time interval may for example be 30 frames/second. Hence, even if a subject is moving, the position, the shape, and the size of a subject region are not greatly different between two continuous image frames. In other words, the size of a region of interest extracted as an object to be tracked from the current image frame is approximately the same as the size of a region of interest extracted from the immediately previous image frame.

Accordingly, the object tracking unit 13 may determine the image size of the input image frame according to the size of a region of interest of the immediately previous image frame, instead of determining the image size of the input image frame according to the size of a region of interest of the input image frame. That is, the tracking unit 13 may determine the image size (i.e., reduction rate) according to the size of a region of interest in each of the image frames, and reduce the size of the next image frame in accordance with the determined image size. In other words, the object tracking unit 13 reduces the size of a new input image frame at the reduction rate determined according to the size of a region of interest of the immediately previous image frame.

In the example of FIG. 3, "reduction rate 100%" is obtained for the image frame 51A according to the size of a region of interest in the immediately previous image frame of the image frame 51A. For this reason, the image frame 51A is not downsized. For the image frame 51B, "reduction rate 50%" is obtained according to the size of a region of interest in the immediately previous image frame of the image frame 51B. As a result, the transformed image frame 53B is generated from the image frame 51B with the reduction rate of 50%. In a similar manner, "reduction rate 25%" is obtained for the image frame 51C according to the size of a region of interest of the immediately previous image frame of the image frame 51C. As a result, the transformed image frame 53C is generated from the image frame 51C with the reduction rate of 25%.

The image conversion processes described above are executed by the size decision unit 33 and the image converter 34. In other words, the size decision unit 33 decides the image size according to the size of a region of interest extracted by the extractor 32. At this time, the size decision unit 33 may decide the image size according to a ratio of the area occupied by a region of interest with reference to the entirety of an input image frame. The image size may be expressed by a reduction rate. Moreover, the size of a region of interest is expressed, for example, by the number of pixels that form the region of interest.

The image converter 34 converts (or transforms) an image frame to be processed according to the image size decided by the size decision unit 33. Here, in this example, an image frame to be processed may be the image frame coming after the image frame that is referred to by the size decision unit 33 to decide the image size (i.e., reduction rate). In this case, the image converter 34 changes the size of an input image frame according to the image size that is decided by the size decision unit 33 based on the region of interest of the immediately previous image frame.

The extractor 32 extracts a region of interest from the transformed image frame generated by the image converter 34. Note that when image conversion is not performed by the image converter 34 (i.e., when the reduction rate is 100%), the extractor 32 extracts a region of interest from the input image frame. Then, as a tracking result, the extractor 32 outputs the information indicating the position of a region of interest which is extracted from each of the image frames (i.e., the input image frame or the transformed image frame).

As described above, in the image processing method according to the embodiment, the size of an image frame is controlled according to the size of a region of interest in an image frame. For example, when the subject 52 gets close to the digital camera 1 and an image region that covers the subject 52 becomes larger on an image frame, the image frame is downsized. Here, as the image frame is downsized, the image region that covers the subject 52 becomes smaller, and the number of pixels to form the image region that covers the subject 52 also becomes smaller. Accordingly, the period of time taken for extracting an image region that covers the subject 52 (i.e., a region of interest) is shortened. As a result, the period of time taken for extracting a region of interest does not become long even when the subject is large in an image frame, and thus it becomes easier to realize the real time object tracking.

Figure 4:
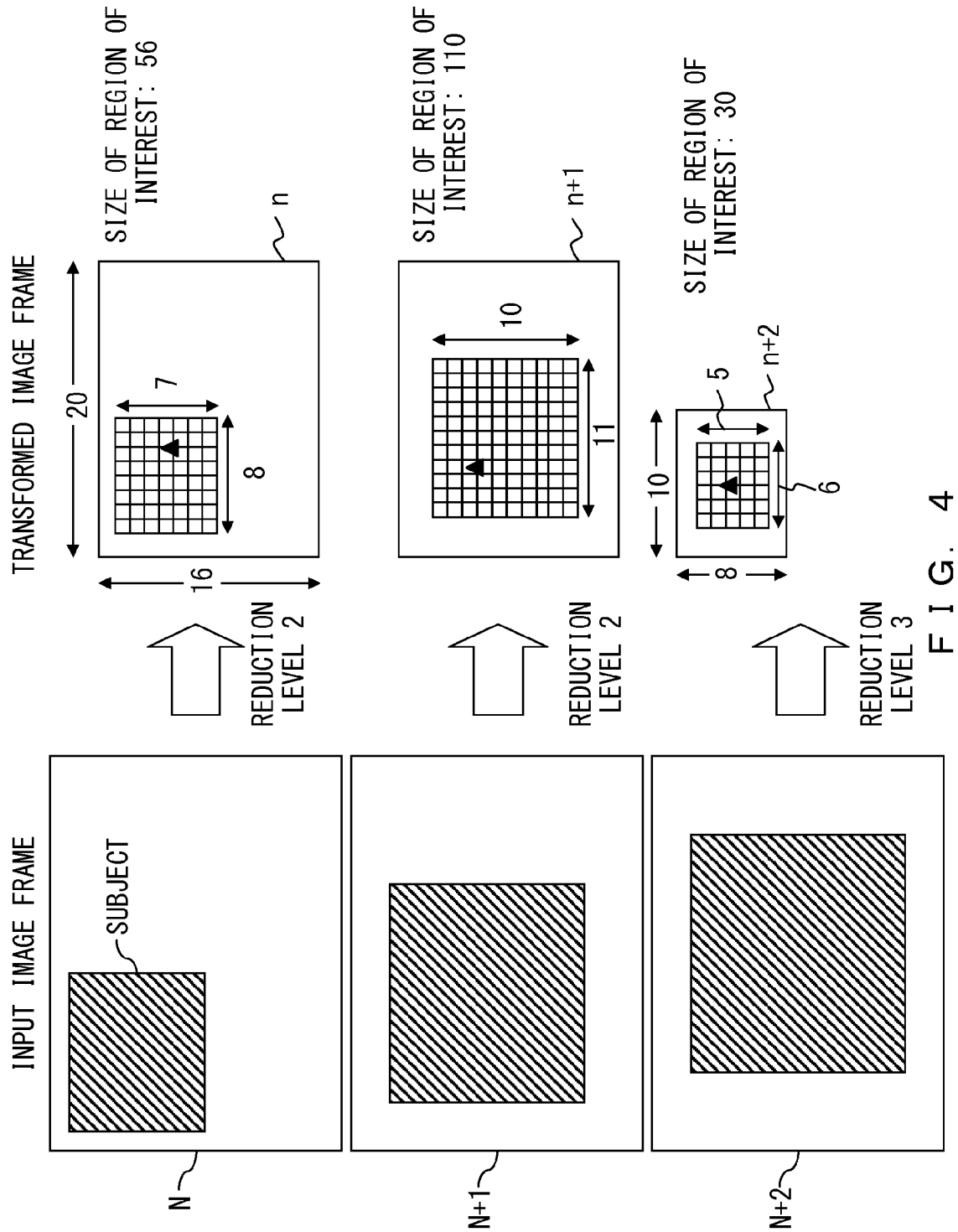
FIG. 4 illustrates an example of the image processing by an object tracking unit.

FIG. 4 illustrates an example of the image processing by the object tracking unit 13. In FIG. 4, image frames N, N+1, and N+2 are image frames input to the object tracking unit 13. Here, the image frame N+1 is the image frame coming immediately after the image frame N, and the image frame N+2 is the image frame coming immediately after the image frame N+1. Note that the size of the input image frames (N, N+1, N+2) is 40×32 pixels. In other words, the width of the input image frames is 40 pixels, and the height is 32 pixels. Further, each of the diagonally shaded areas on the image frames N, N+1, and N+2 indicates an image region that covers a subject to be tracked. In this example, a subject is gradually getting closer to the digital camera 1, and the subject is moving in the rightward direction with reference to the digital camera 1.

The object tracking unit 13 includes an image conversion table, which is illustrated in FIG. 5, in order to control the size of an image frame. In the embodiment, three reduction levels are defined in the image conversion table. A reduction level 1 indicates an operation mode in which the size of an input image frame is not changed. Accordingly, when the reduction level 1 is set, a region of interest is extracted from the input image frame. A reduction level 2 indicates an operation mode in which an input image frame is transformed into 20×16 image frame. Accordingly, when the reduction level 2 is set, the input image frame is transformed into a transformed image frame having 20×16 pixels, and a region of interest is extracted from the transformed image frame. Furthermore, a reduction level 3 indicates an operation mode in which an input image frame is transformed into 10×8 image frame. Accordingly, when the reduction level 3 is set, the input image frame is transformed into a transformed image frame having 10×8 pixels, and a region of interest is extracted from the transformed image frame.

In the image conversion table, a threshold 1 and a threshold 2 are registered for each of the reduction levels. In this example, the threshold 1 and the threshold 2 are expressed by the number of pixels. The threshold 1 is used for determining whether the reduction level should be maintained or decreased. For example, it is assumed that the object tracking unit 13 operates at the reduction level 2. Here, the threshold 1 for the reduction level 2 is "25". In this case, when the number of pixels of a region of interest extracted from the transformed image frame is larger than or equal to "25", the reduction level 2 is maintained. On the other hand, when the number of pixels of a region of interest extracted from the transformed image frame is smaller than "25", the reduction level 2 is changed to the reduction level 1.

The threshold 2 is used for determining whether the reduction level should be maintained or increased. For example, in a similar manner to the above example, it is assumed that the object tracking unit 13 operates at the reduction level 2. Here, the threshold 2 for the reduction level 2 is "100". In this case, when the number of pixels of a region of interest extracted from the transformed image frame is smaller than or equal to "100", the reduction level 2 is maintained. On the other hand, when the number of pixels of a region of interest extracted from the transformed image frame is larger than "100", the reduction level 2 is changed to the reduction level 3.

The threshold 1 for the reduction level 1 is "−1". Accordingly, when the object tracking unit 13 operates at the reduction level 1, the decision to "decrease the reduction level" is not made. Moreover, the threshold 2 for the reduction level 3 is infinite. Accordingly, when the object tracking unit 13 operates at the reduction level 3, the decision to "increase the reduction level" is not made.

The image conversion table of FIG. 5 is illustrated as just one embodiment. In other words, the image conversion table may have only two reduction levels, or may have more than four reduction levels. Moreover, the width and height of the transformed image frame as well as the values of the threshold 1 and threshold 2 are not limited to the values indicated in FIG. 5.

Return to FIG. 4. Here, it is assumed that when the image frame N is input, the object tracking unit 13 operates at the reduction level 2. In this case, the image converter 34 reduces the size of the image frame N to an image frame with 20×16 pixels. By so doing, a transformed image frame n is generated.

Then, the extractor 32 extracts a region of interest from the transformed image frame n. At this time, the extractor 32 extracts a region of interest that includes a point of interest indicated by a symbol ▲. The point of interest indicates the position or pixel at which the extraction of a region of interest starts. Note that the coordinates of a point of interest are calculated by using the previous image frame. Moreover, the extractor 32 detects the size (or area) of a region of interest extracted from the transformed image frame n. In the embodiment, the size of a region of interest is "56".

Furthermore, the extractor 32 calculates the central coordinates (or barycenter) of a region of interest extracted from the transformed image frame n. The calculated central coordinates are used as a point of interest for extracting a region of interest from the next image frame.

As a tracking result, the object tracking unit 13 outputs tracking target position information indicating the position of a region of interest extracted by the extractor 32. Note that this region of interest is extracted from the transformed image frame n obtained by transforming the image frame N at a reduction rate of 50%. Accordingly, the coordinates of a region of interest extracted from the transformed image frame n are mapped in an image frame with 40×32 pixels when output as the tracking target position information. For example, it is assumed that a region of interest extracted from the transformed image frame n is in a rectangular shape, and the coordinates of the four corners are (2, 2), (9, 2), (2, 8), and (9, 8), respectively. In this case, the object tracking unit 13 outputs the coordinates (4, 4), (18, 4), (4, 16), and (18, 16) as the tracking target position information.

The image frame N+1 is input to the object tracking unit 13. The size decision unit 33 decides the reduction level of the image frame N+1 according to the size of a region of interest extracted from the previous frame (i.e., the transformed image frame n). In this example, the size of a region of interest in the transformed image frame n is "56". Moreover, the object tracking unit 13 operates at the reduction level 2. Here, the thresholds 1 and 2 at the reduction level 2 are "25" and "100", respectively. Thus, they are expressed as "threshold 1≤the size of a region of interest≤threshold 2". Accordingly, the size decision unit 33 maintains the reduction level just as it is. In other words, the reduction level of the image frame N+1 is "2".

The image converter 34 transforms the input image frame at the reduction level decided by the size decision unit 33. In this case, the image converter 34 reduces the size of the image frame N+1 to an image frame with 20×16 pixels. As a result, the transformed image frame n+1 is generated.

The extractor 32 extracts a region of interest from the transformed image frame n+1. At this time, the extractor 32 extracts a region of interest that includes the point of interest calculated by using the previous frame. Moreover, the extractor 32 detects the size of a region of interest that is extracted from the transformed image frame n+1. In the embodiment, the size of a region of interest is "110". Furthermore, the extractor 32 calculates the central coordinates of the region of interest extracted from the transformed image frame n+1 as a point of interest to be used for the next frame.

As a tracking result, the object tracking unit 13 outputs the tracking target position information indicating the position of a region of interest extracted by the extractor 32. At this time, the coordinates of a region of interest extracted from the transformed image frame n+1 are mapped on an image frame having 40×32 pixels, as described above.

The image frame N+2 is input to the object tracking unit 13. The size decision unit 33 decides the reduction level of the image frame N+2 according to the size of a region of interest extracted from the previous frame (i.e., the transformed image frame n+1). In this example, the size of a region of interest in the transformed image frame n+1 is "110". Moreover, the object tracking unit 13 operates at the reduction level 2. Here, the threshold 2 for the reduction level 2 is "100", as described above. That is to say, the size of a region of interest is larger than the threshold 2. Accordingly, the size decision unit 33 increases the reduction level. In other words, the reduction level of the image frame N+2 is determined to be "3".

The image converter 34 transforms the input image frame at the reduction level decided by the size decision unit 33. In this case, the image converter 34 reduces the size of the image frame N+2 to an image frame having 10×8 pixels. As a result, the transformed image frame n+2 is generated.

The extractor 32 extracts a region of interest from the transformed image frame n+2. At this time, the extractor 32 extracts a region of interest that includes a point of interest calculated by using the previous frame. Note that the reduction rate of the image frame N+2 is different from the reduction rate of the previous frame. Specifically, the image frame N+1 is processed at the reduction level 2, but the image frame N+2 is processed at the reduction level 3. Accordingly, a point of interest calculated by using the previous frame (i.e., the central coordinates of the region of interest) is mapped by the size decision unit 33 according to the change in the reduction rate. Here, the reduction rate at the reduction level 2 is 50%, and the reduction rate at the reduction level 3 is 25%. Accordingly, for example, if it is assumed that the central coordinates of the region of interest extracted from the transformed image frame n+1 are (10, 8), then the coordinates of a point of interest used for the transformed image frame n+2 are (5, 4).

The extractor 32 detects the size of a region of interest that is extracted from the transformed image frame n+2. In the embodiment, the size of a region of interest is "30". Further, the extractor 32 calculates the central coordinates of the region of interest extracted from the transformed image frame n+2 as a point of interest to be used for the next frame.

As a tracking result, the object tracking unit 13 outputs the tracking target position information indicating the position of a region of interest extracted by the extractor 32. At this time, the coordinates of a region of interest extracted from the transformed image frame n+2 are mapped on an image frame having 40×32 pixels.

As described above, the object tracking unit 13 extracts a region of interest from each of the input image frames. In the example in FIG. 4, the object tracking unit 13 extracts a region of interest from each of the transformed image frames, and maps the extracted region of interest on an input image format. Here, a region of interest indicates an image region that covers a tracking target subject. Thus, the object tracking is realized by the image processing as described above.

In the above image processing, the reduction level of an image frame is decided according to the size of a region of interest on the image frame. For example, in the example of FIG. 4, when the size of a region of interest exceeds the threshold 2 in the image frame N+1, the reduction levels of the following image frames become higher. As a result, the number of pixels in a region of interest that is extracted from each of the following image frames is suppressed. In other words, even if a region of interest that indicates the subject in an input image frame becomes large, the period of time taken for extracting a region of interest does not become longer.

Figure 6:
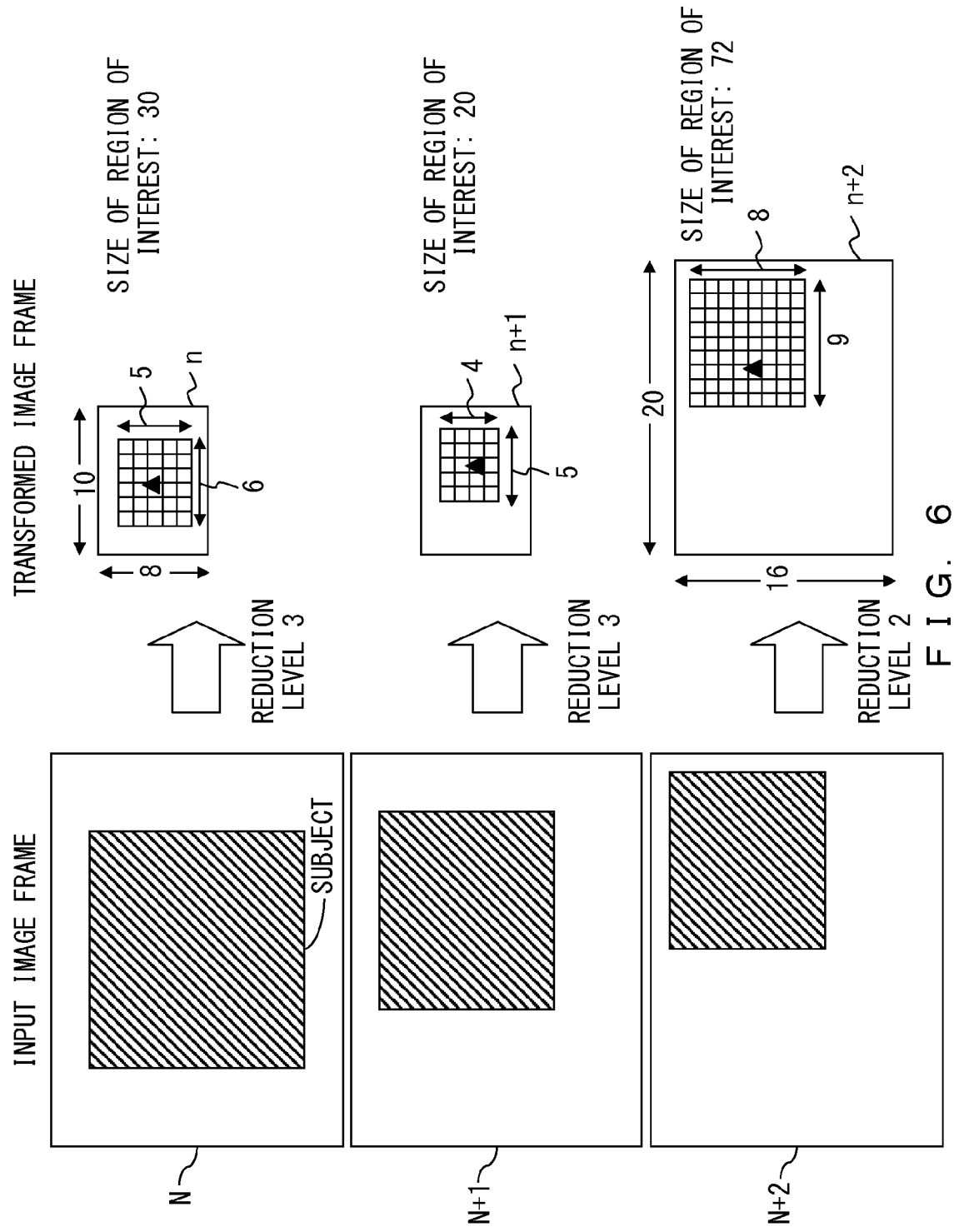
FIG. 6 illustrates another example of the image processing by an object tracking unit.

FIG. 6 illustrates another example of the image processing by the object tracking unit 13. In the embodiment of FIG. 6, a region of interest that indicates the subject gradually becomes smaller in input image frames.

In this example, the size of a region of interest is smaller than the specified threshold in the image frame N+1. In other words, the size of a region of interest that is extracted from the transformed image frame n+1 is "20". Note that this size is smaller than the threshold 1 for the reduction level 3. Accordingly, the reduction level is changed from "3" to "2". As a result, the image frame N+2 and the following image frames are downsized and processed at the reduction level 2.

As described above, when the size of a region of interest becomes smaller than the specified threshold, the size of the transformed image frame becomes larger in the following frames. When the size of a region of interest that corresponds to a tracking target subject is small, it is difficult to track the target subject. However, as illustrated in the example of FIG. 6, when the size of a region of interest becomes smaller in the transformed image frame, the reduction level becomes lower accordingly. Therefore, according to the image processing device of the embodiment, the possibility of losing a tracking target subject in the image frame becomes small.

FIG. 7 is a flowchart illustrating the processes of the object tracking unit 13. The processes in this flowchart are executed, for example, when a tracking target object is designated by a user of the digital camera 1.

In step S1, the object tracking unit 13 sets a point of interest as start coordinates of region extraction. The point of interest is determined, for example, according to the coordinates of the tracking target object designated by a user on the image frame.

In step S2, the object tracking unit 13 sets "1" as an initial value for the reduction level, and also sets the thresholds 1 and 2 that correspond to the reduction level 1. Moreover, the object tracking unit 13 initializes previous region size data. The previous region size data indicates the size of a region of interest extracted from the previous frame. Note that the previous region size data is stored in a memory provided for the object tracking unit 13.

In step S3, the extractor 32 reads an image frame stored in the image memory 31. Note that image frames obtained by the image input unit 11 are stored in the image memory 31. The size decision unit 33 obtains the previous region size data from the above memory.

In step S4, the size decision unit 33 compares the previous region size data with the threshold 1. When the previous region size data is smaller than the threshold 1, in step S6, the size decision unit 33 decreases the reduction level by one degree. In step S5, the size decision unit 33 compares the previous region size data with the threshold 2. When the previous region size data is larger than the threshold 2, in step S7, the size decision unit 33 increases the reduction level by one degree.

In step S8, the size decision unit 33 updates the thresholds 1 and 2 according to the change in the reduction level in step S6 or S7. For example, when the reduction level is increased from "2" to "3" in step S7, the threshold 2 is updated from "100" to "∞". Further, in step S9, the size decision unit 33 maps a point of interest according to the change in the reduction level in step S6 or S7. Note that the coordinates of a point of interest mapped in step S9 have been calculated in step S12 performed for the previous frame.

When the previous region size data is larger than or equal to the threshold 1 and smaller than or equal to the threshold 2 (step S4: No, step S5: No), steps S6-S9 are skipped. In this case, the reduction level is maintained. Moreover, the mapping of the point of interest calculated by using the previous frame may be omitted.

In step S10, the image converter 34 generates the transformed image frame from the input image frame according to the reduction level. In other words, the image converter 34 changes the image size of an image frame to be processed according to the reduction level decided by the size decision unit 33. Note that in the embodiment, the image size is unchanged when the object tracking unit 13 operates at the reduction level 1.

In step S11, the extractor 32 extracts a region of interest from the transformed image frame generated in step S10 with reference to a point of interest. The coordinates of a point of interest have been calculated by using the previous frame. When the reduction level is changed in step S6 or S7, the coordinates of a point of interest are obtained by mapping the coordinates calculated by using the previous frame in step S9.

In step S12, the extractor 32 calculates the coordinates of a point of interest for the next frame according to the extracted region of interest. The coordinates of a point of interest for the next frame are obtained, for example, by calculating the central coordinates of the extracted region of interest.

In step S13, the extractor 32 detects the size of the region of interest that is extracted in step S11. Then, the extractor 32 sets the size of the detected region of interest as the previous region size data for the next frame. The size of a region of interest is detected by counting the number of pixels in a region of interest. After this, the processes of the object tracking unit 13 return to step S3.

In the flowchart of FIG. 7, for example, when the image frames N+1 and N+2 of FIG. 6 are input, the following processes are performed. Here, it is assumed that steps S10-S13 are performed for the image frame N+1. In this case, in step S10, the transformed image frame n+1 is generated from the image frame N+1. In step S11, a region of interest is extracted from the transformed image frame n+1. In step S12, a point of interest for the next image frame is determined by calculating the central coordinates of the extracted region of interest. In step S13, the size of the extracted region of interest is detected. Here, the size of a region of interest is "20". Then, this value is stored as the previous region size data.

Steps S3-S13 are performed for the image frame N+2. The reduction level when the image frame N+2 is input is "3". Moreover, the previous region size data indicating the size of a region of interest in the transformed image frame n+1 is "20". In other words, the previous region size data is smaller than the threshold 1 for the reduction level 3. Accordingly, "Yes" is obtained in step S4, and the reduction level is decreased from "3" to "2" in step S6. Further, the coordinates of a point of interest calculated by using the previous frame (i.e., the transformed image frame n+1) are mapped in step S9 according to the change from the reduction level 3 to the reduction level 2. After this, in steps S10-S13, a region of interest is extracted from the transformed image frame n+2, and the coordinates of a point of interest for the next image frame are calculated and the size of a region of interest is detected.

As described above, the object tracking unit 13 performs the processes of steps S3-S13 for each of the image frames. During the processes, a region of interest extracted from each of the image frames in step S11 is output as a tracking target object. Accordingly, the object tracking is realized.

In the procedures illustrated in the flowchart of FIG. 7, when the input image frame is processed, the reduction level of the input image frame is determined according to the size of the region of interest in the previous frame. However, the image processing method according to the embodiment is not limited to these procedures. In other words, for example, when a region of interest is extracted from the input image frame, the reduction level of the next image frame may be determined according to the size of the extracted region of interest.

Another Embodiment

As described above, in the embodiment of FIGS. 4 to 7, the reduction level of the input image frame is determined according to the size of the region of interest in the previous frame. By contrast, in an embodiment that will be explained below, the reduction level of the input image frame is determined according to the size of a region of interest of the input image frame.

In the embodiment described below, for example, when the extractor 32 determines that the size of a region of interest exceeds a specified threshold size in the process of extracting a region of interest from the input image frame (or the transformed image frame of the input image frame), the size decision unit 33 may decide a new image size before the extractor 32 completes the extraction process. The image converter 34 may change the size of the input image frame (or transformed image frame of the input image frame) to the new image size decided by the size decision unit 33. Then, the extractor 32 extracts a region of interest from the image frame transformed by the image converter 34.

Figure 8:
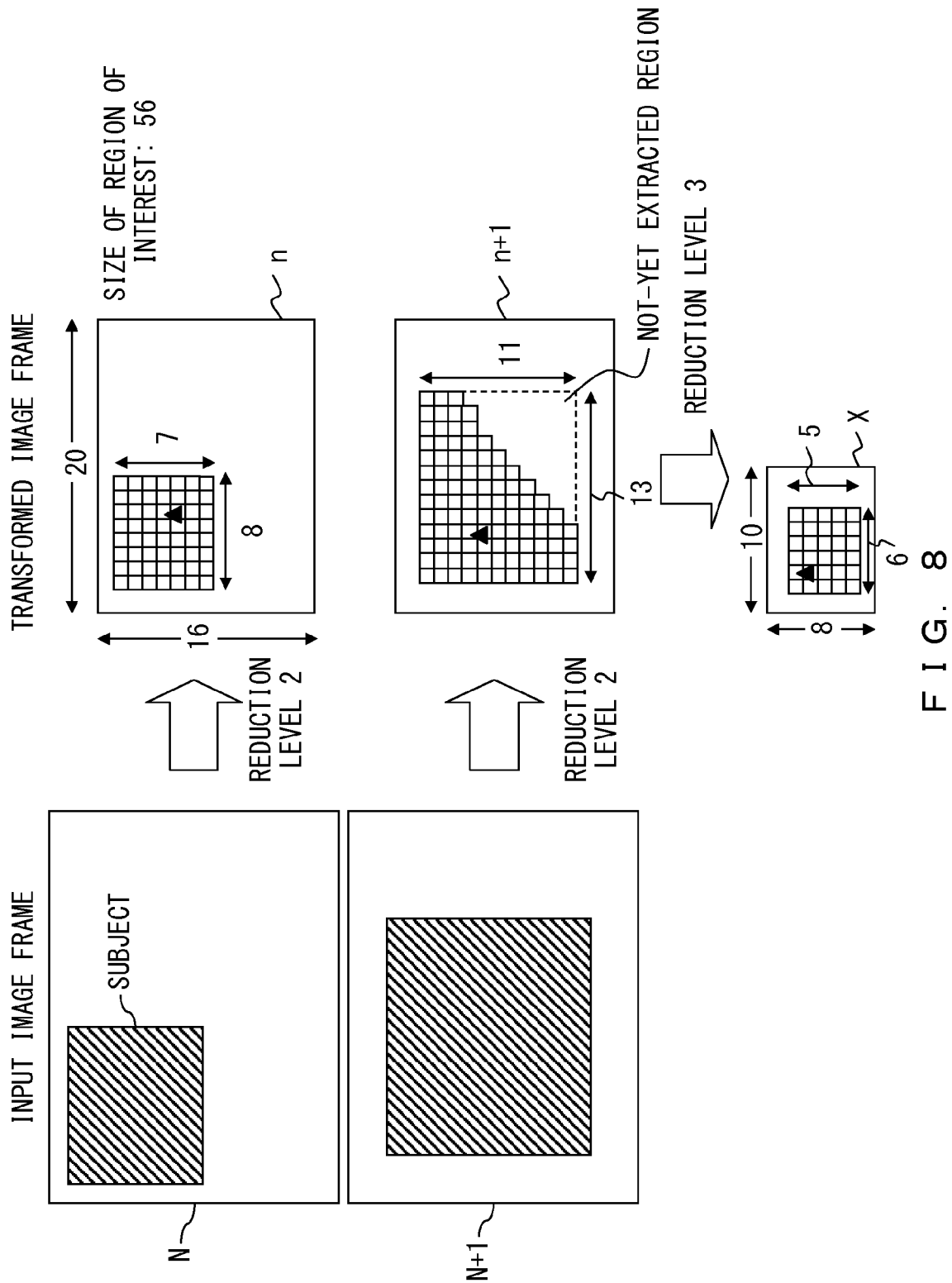
FIG. 8 illustrates an example of the image processing by an object tracking unit according to another embodiment.

FIG. 8 illustrates an example of the image processing according to another embodiment. Here, it is assumed that image frames N and N+1 are input to the object tracking unit 13. The image frame N+1 is the image frame which comes immediately after the image frame N. In this example, the subject is rapidly approaching the digital camera 1.

When the image frame N is input, the object tracking unit 13 performs image processing similar to the procedures explained above with reference to FIGS. 4 to 7. In other words, the image converter 34 generates a transformed image frame n by reducing the size of the image frame N. Here, it is assumed that the reduction level is "2". The extractor 32 extracts a region of interest from the transformed image frame n, and detects the size of the region of interest. In this example, the size of the region of interest is "56". Further, the extractor 32 calculates the coordinates of a point of interest for the next frame.

Subsequently, when the image frame N+1 is input, the object tracking unit 13 performs image processing similar to the procedures explained above with reference to FIGS. 4 to 7. In other words, the size decision unit 33 decides the reduction level according to the size of the region of interest of the previous frame (i.e., the transformed image frame n). In this example, the reduction level 2 is maintained because the size of a region of interest is larger than or equal to the threshold 1 and smaller than or equal to the threshold 2. Accordingly, the image converter 34 generates the transformed image frame n+1 by reducing the size of the image frame N+1 with reduction level 2.

The extractor 32 starts extracting a region of interest with reference to the point of interest calculated by using the previous frame. A region of interest is detected, as described above, by sequentially extracting neighboring pixels whose pixel value (for example, color component) is close to that of the pixel at a point of interest, where pixels closer to the point of interest are given priority in extracting. At this time, the extractor 32 counts up a region counter every time a neighboring pixel whose pixel value (for example, color component) is close to that of the pixel at a point of interest is extracted.

In the example of FIG. 8, a region of interest in the transformed image frame n+1 is has 13×11 pixels. In other words, the number of pixels of a region of interest is "143". The extractor 32 extracts pixels that belong to the region of interest one by one, where pixels close to the point of interest are given priority in extracting. During the extraction process, the extractor 32 counts up the number of the extracted pixels by using the region counter.

The size decision unit 33 monitors whether or not the region counter has reached the threshold 2. When the region counter has reached the threshold 2, the extractor 32 terminates the process of extracting a region of interest in response to a notification from the size decision unit 33. Moreover, the size decision unit 33 increases the reduction level. In this example, the threshold 2 for the reduction level 2 is "100". Thus, when the number of the pixels that are extracted by the extractor 32 reaches "100" as illustrated in FIG. 8, the extractor 32 terminates the extraction process. Further, the size decision unit 33 changes the reduction level from "2" to "3".

Subsequently, the image converter 34 further transforms the transformed image frame n+1 at the reduction level decided by the size decision unit 33. As a result, an image frame X with 10×8 pixels is generated. The image converter 34 may generate the image frame X with 10×8 pixels from the input image frame N+1.

After that, the object tracking unit 13 performs image processing on the image frame X as follows. The extractor 32 extracts a region of interest from the image frame X. This region of interest is mapped on an image frame with 40×32 pixels when output as a tracking result. Further, the extractor 32 calculates the coordinates of a point of interest for the next image frame from the image frame X by using the extracted region of interest.

As described above, in this embodiment, when it is estimated that the size of a region of interest exceeds the threshold 2 in the process of extracting a region of interest, the extraction process is terminated, and the image frame is further downsized. Then, the process of extracting a region of interest is performed on the downsized image frame. As a result, the period of time taken for extracting a region of interest is shortened.

In the example of FIG. 8, when 100 pixels are extracted from the region of interest in the transformed image frame n+1, the image processing on the transformed image frame n+1 terminates. In other words, the period of time taken for extracting the remaining 43 pixels is cut down. Subsequently, 30 pixels that belong to the region of interest on the image frame X are extracted. Here, if the processing time taken for extracting the 30 pixels that belong to the region of interest on the image frame X is shorter than the processing time taken for extracting the remaining 43 pixels in the image frame n+1, the period of time taken for extracting a region of interest for the image frame N+1 is shortened.

Figure 9B:
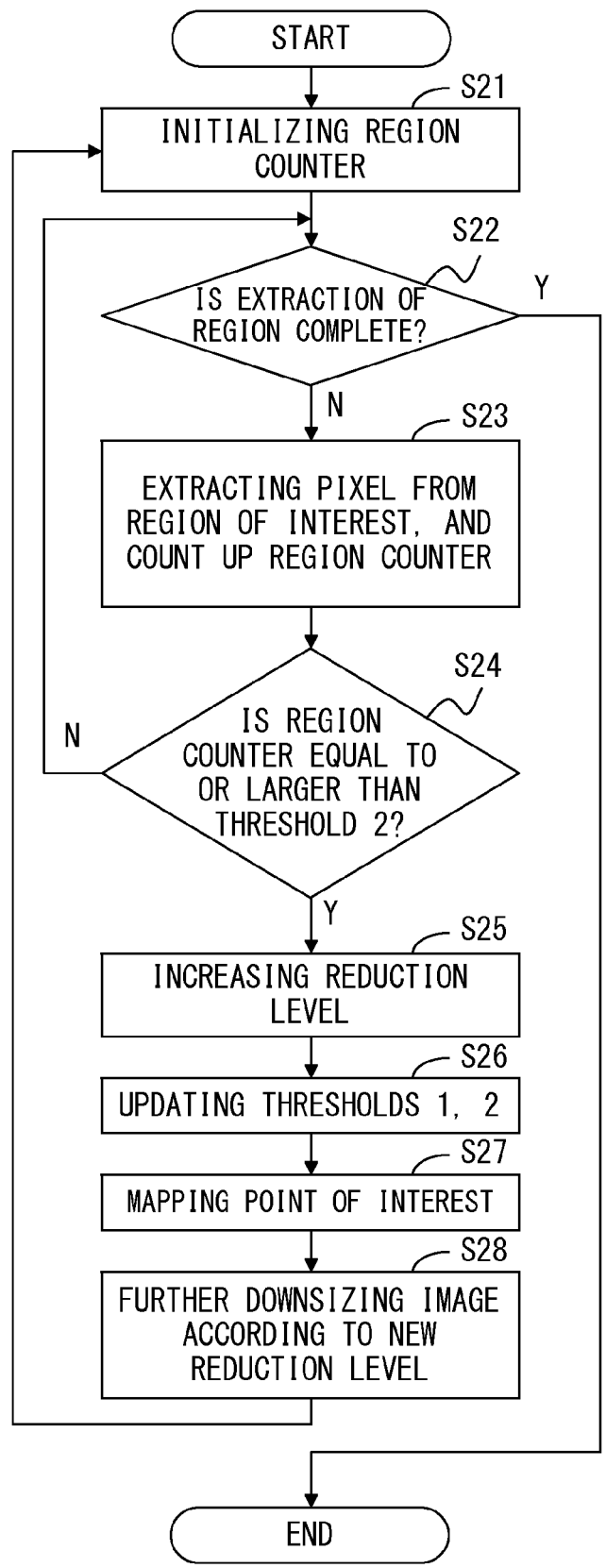

FIGS. 9A and 9B are flowcharts illustrating the processes of an object tracking unit according to the embodiment of FIG. 8. In a similar manner to the procedures of FIG. 7, the processes in this flowchart are performed, for example, when a tracking subject is designated by a user of the digital camera 1.

The procedures in this embodiment are the similar to steps S1-S13 in FIG. 7. However, steps S5 and S7 in FIG. 7 are not performed in this embodiment. Moreover, step S20 is performed instead of step S11 in FIG. 7 in this embodiment. In step S20, a region of interest is extracted in a similar manner to step S11. However, steps S21-S28 in FIG. 9B are performed in step S20. Step S20 is realized by the cooperative operations of the extractor 32, the size decision unit 33, and the image converter 34.

In step S21, the extractor 32 initializes a region counter. In other words, zero is written into the region counter. The region counter counts the number of the pixels that are extracted by the extractor 32.

In step S22, the extractor 32 determines whether the extraction of a region of interest is complete. Here, the extractor 32 extracts neighboring pixels in the procedures (1)-(4) described above. In other words, for example, whether or not there is any neighboring pixel where the difference between pixel value in it and the pixel value of the pixel at a point of interest is smaller than a specified threshold exists is determined in step S22. If the extraction of a region of interest is complete, the process of step S20 terminates.

When the extraction of a region of interest is not yet complete, in step S23, the extractor 32 extracts one pixel from a region of interest, and counts up the region counter by one. In step S24, the extractor 32 determines whether the region counter is equal to or larger than the threshold 2. When the region counter is equal to or larger than the threshold 2, the process shifts to step S25. On the other hand, when the region counter is smaller than the threshold 2, the process returns to step S22. As described above, the extractor 32 extracts pixels in a region of interest one by one until the region counter reaches the threshold 2. Note that if all the pixels in a region of interest are extracted before what the region counter reaches the threshold 2, the process of step S20 terminates.

In step S25, the size decision unit 33 increases the reduction level by one degree. Steps S26-S27 are substantially the same as steps S8-S9. That is, the thresholds 1 and 2 are updated according to the change in the reduction level, and the coordinates of a point of interest are mapped.

In step S28, the image converter 34 further reduces the size of the image frame according to a new reduction level that is decided in step S25. After this, the processes of the object tracking unit 13 return to step S21. Accordingly, the object tracking unit 13 starts the process of extracting a region of interest from the downsized image frame that is newly generated in step S28.

Hereinafter, an embodiment in which the image frame N+1 of FIG. 8 is processed in the procedures of FIGS. 9A and 9B will be explained. It is assumed that when the image frame N+1 is input, the object tracking unit 13 is operating at the reduction level 2. Moreover, the size of the region of interest in the previous frame (i.e., the transformed image frame n) is "56". Accordingly, the previous region size data is "56".

In step S3, the image frame N+1 is read. Here, the previous region size data is "56", which is larger than the threshold 1 (=25) for the reduction level 2, and thus steps S6, S8, and S9 are not performed.

In step S10, the image frame N+1 is transformed according to the reduction level 2, and the transformed image frame n+1 is generated. Subsequently, the processes of step S20 are performed on the transformed image frame n+1. In other words, steps S21-S28 in FIG. 9B are performed on the transformed image frame n+1.

In steps S22-S24, pixels that form a region of interest in the transformed image frame n+1 are extracted one by one, and the region counter counts up accordingly. When the region counter has reached "100", the reduction level is increased from "2" to "3" in step S25. Furthermore, an image frame X is generated from the image frame N+1 or the transformed image frame n+1 in step S28, by using the point of interest mapped in step S27.

After that, the processes of steps S22-S24 are performed on the image frame X. Here, the number of pixels of the region of interest in the image frame X is "30", which is smaller than the threshold 2 for the reduction level 3. Accordingly, steps S22-S24 are repeatedly performed and all the pixels of the region of interest in the image frame X are extracted before it is determined to be "Yes" in step S24, and the processes of step S20 terminate. Further, steps S12 and S13 of FIG. 9A are performed, and the image processing on the image frame N+1 terminates.

In the method illustrated in FIGS. 8 to 9B, when the image frame is downsized as the region counter reaches the threshold 2 (steps S24-S28), a region of interest is extracted from the downsized image frame from the beginning. However, the embodiment is not limited to this scheme. For example, the information of the state when the region counter has reached the threshold 2 may be taken over by the downsized image frame. In the example of FIG. 8, 100 pixels are extracted from the transformed image frame N+1 as pixels in the region of interest. In this case, the region that corresponds to the 100 pixels extracted from the transformed image frame N+1 is mapped on the image frame X. The region mapped from the transformed image frame N+1 is configured as a portion of the region of interest on the image frame X. Then, the remaining region of interest is extracted from the image frame X. According to this method, the period of time taken for extracting a region of interest is further shortened compared with the method illustrated in FIGS. 8 to 9B.

<Other Matters>

In the example of FIGS. 4 to 7, the image size of the next image frame is determined according to the size of a region of interest in a current image frame. In the example of FIGS. 8 to 9B, according to the size of a region of interest in a current image frame, the image size of the current image frame is determined. However, the image processing method according to the present invention is not limited to this scheme. For example, according to the size of a region of interest in a certain image frame, the image size of an image frame that comes after the next image frame or even later may be determined. In cases where real time processing is not required, according to the size of a region of interest in a certain image frame, the image size of an image frame that comes earlier than that certain image frame may be determined.

In the embodiments described above, a region of interest is extracted by using pixel value (for example, color component of a pixel), but a region of interest may be extracted by using a different method. The image processing method according to the invention is applicable, for example, to cases in which a region of interest is detected from image frames by using the shape of the edge of a tracking target subject.

In the embodiments described above, the image processing device according to the embodiments is provided inside the digital camera, but may be provided outside the digital camera. For example, the image processing device according to the embodiments may be provided in the server computer. In this case, the image data output from the digital camera is transferred to the server computer. The server computer performs the object tracking process, and transfers the result back to the digital camera. Then, the digital camera controls, for example, the focal length, according to the tracking result received from the server computer.

<Hardware Configuration>

Figure 10:
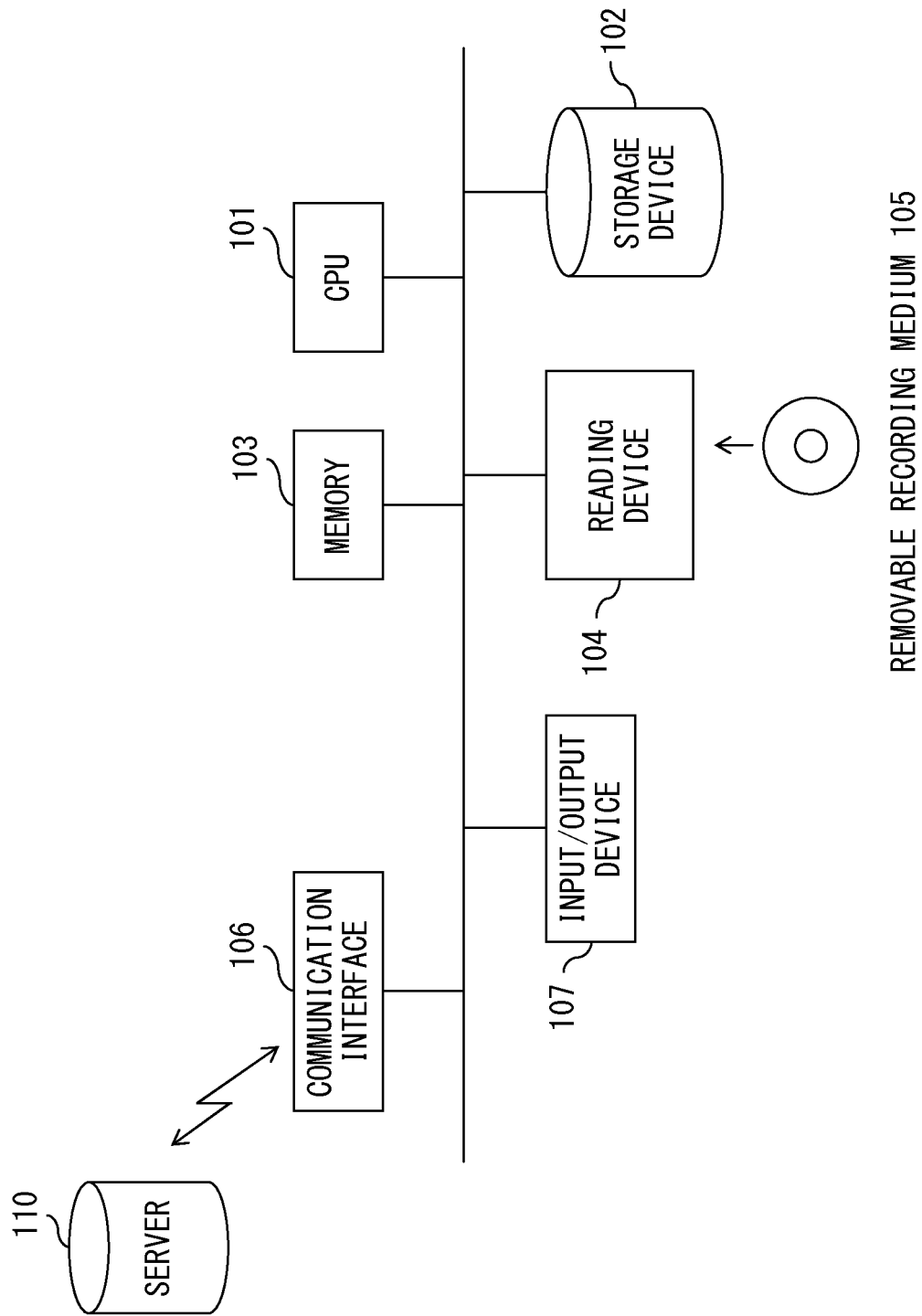
FIG. 10 illustrates the hardware configuration of the image processing device according to the embodiments.

FIG. 10 illustrates the hardware configuration of the image processing device according to the embodiments. In FIG. 10, a CPU 101 executes an image processing program by using a memory 103. A storage device 102 stores the image processing program. The storage device 102 may be an external storage device. The memory 103 is, for example, a semiconductor memory, and may include a RAM area and a ROM area. Note that the memory 103 may be used, for example, in order to store an image frame. As described above, the image processing device according to the embodiments is realized by a computer (or a processor system) with a processor and a memory.

A reading device 104 accesses a removable recording medium 105 according to an instruction from the CPU 101. It is assumed that the removable recording medium 105 may be realized by, for example, a semiconductor device, a medium to/from which information is input and output by a magnetic effect, and a medium to/from which information is input and output by an optical effect. A communication interface 106 transmits and receives the data through the network according to an instruction from the CPU 101. An input/output device 107 corresponds to a display device, a device that receives an instruction from a user, or the like in the embodiments. Note that it is not always necessary for the image processing device according to the embodiments to include the communication interface 106 and/or the input/output device 107.

The image processing program according to the embodiments is provided, for example, in the following ways.
(1) Installed in the storage device 102 in advance
(2) Provided by the removable recording medium 105
(3) Downloaded from a program server 110

At least a part of the object tracking unit 13 according to the embodiments (i.e., the extractor 32, the size decision unit 33, and the image converter 34) are realized by executing the image processing program in the computer configured as above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An image processing device comprising:
an extractor configured to extract a region of interest which satisfies a specified condition from a first image frame;
a size decision unit configured to decide an image size according to a size of the region of interest extracted by the extractor; and
an image converter configured to change the size of an image frame to be processed according to the image size decided by the size decision unit to generate a transformed image frame,
wherein the extractor extracts a region of interest which satisfies the specified condition from the transformed image frame
wherein
the image converter changes the size of a second image frame obtained after the first image frame according to the image size decided by the size decision unit to generate the transformed image frame, and
the extractor extracts the region of interest from the transformed image frame.

2. The image processing device according to claim 1, wherein
when the extractor determines that a size of the region of interest exceeds a specified threshold size in an extraction process in which the region of interest is extracted from the first image frame, the size decision unit decides the image size before the extraction process by the extractor is complete,
the image converter changes the size of the first image frame according to the image size decided by the size decision unit to generate the transformed image frame, and
the extractor extracts the region of interest from the transformed image frame.

3. The image processing device according to claim 1, wherein
the size decision unit decides a reduction rate of the image frame to be processed according to a size of the region of interest extracted from the first image frame by the extractor, and
the image converter reduces the size of the image frame to be processed according to the reduction rate decided by the size decision unit.

4. A non-transitory computer-readable recording medium having stored therein a program for causing a computer to execute a process for object tracking, the process comprising:
extracting a region of interest which satisfies a specified condition from a first an input image frame;
deciding an image size according to a size of the extracted region of interest;
changing the size of a second image frame obtained after the first image frame an image frame to be processed according to the decided image size to generate a transformed image frame; and
extracting a region of interest which satisfies the specified condition from the transformed image frame.

5. A digital camera comprising:
an image input unit;
a controller configured to control the image input unit;
an extractor configured to extract a region of interest which satisfies a specified condition from a first image frame obtained by the image input unit;
a size decision unit configured to decide an image size according to a size of the region of interest extracted by the extractor; and
an image converter configured to change the size of an image frame to be processed according to the image size decided by the size decision unit to generate a transformed image frame, wherein
the extractor extracts a region of interest which satisfies the specified condition from the transformed image frame, and
the controller controls the image input unit to focus on the region of interest extracted from the transformed image frame, wherein
the image converter changes the size of a second image frame obtained after the first image frame according to the image size decided by the size decision unit to generate the transformed image frame, and
the extractor extracts the region of interest from the transformed image frame.

6. The digital camera according to claim 5, further comprising
an image memory configured to store image data obtained by the image input unit focusing on the region of interest extracted from the transformed image frame.

\* \* \* \* \*

UNITED STATES PATENT AND TRADEMARK OFFICE
CERTIFICATE OF CORRECTION

PATENT NO. : 8,970,723 B2  
APPLICATION NO. : 13/666369  
DATED : March 3, 2015  
INVENTOR(S) : Satoru Ushijima Page 1 of 1

It is certified that error appears in the above-identified patent and that said Letters Patent is hereby corrected as shown below:

In the Claims

Column 18, Line 40, In Claim 4, after "first" delete "an input".
Column 18, Line 44-45, In Claim 4, before "according" delete "an image frame to be processed".

Signed and Sealed this
Eighteenth Day of August, 2015

Michelle K. Lee
*Director of the United States Patent and Trademark Office*